3,553,243
METHOD OF INHIBITING EVOLUTION OF HYDROGEN CYANIDE FROM ORGANIC THIOCYANATE COMPOSITIONS
Delton William Hein, Darien, Donald Clifford Wehner, Fairfield, and Richard Parke Welcher, Old Greenwich, Conn., assignors to American Cyanamid Company, Stamford, Conn., a corporation of Maine
No Drawing. Filed Apr. 5, 1966, Ser. No. 540,193
Int. Cl. C07c 161/02, 161/04
U.S. Cl. 260—454                                                7 Claims

ABSTRACT OF THE DISCLOSURE

Evolution of HCN from organic thiocyanate compositions is prevented by incorporating about 0.1% to 10% by weight of a compound reactive with mercaptans and HCN such as a lower aldehyde, ethyl formate or 1-chloro-2,4-dinitrobenzene.

---

This invention relates to methods and materials for inhibiting the evolution of hydrogen cyanide from thiocyanate compositions. More particularly, this invention relates to the prevention of toxicity caused by the hydrogen cyanide evolved as a decomposition product of organic thiocyanate compositions.

A serious deterrent to utilization of organic thiocyanates, particularly as biocides, is the safety hazard caused by the generation of hydrogen cyanide from these compounds or from mixtures thereof with carriers, solvents, or diluents. Even if the hydrogen cyanide level is so low as not to be seriously toxic, the strong prejudice against use of a product which will generate hydrogen cyanide will hinder wide spread use of organic thiocyanates although superior reactivity or biocidal activity is demonstrated.

Hydrogen cyanide may result from the decomposition of an organic thiocyanate not only during the synthesis and use of the compound but also during storage thereof. Moreover, although the mechanism of decomposition is not fully understood, hydrogen cyanide has been detected in an inert atmosphere above dried, sublimed samples of organic thiocyanates.

Further, it has been observed that decomposition of organic thiocyanates with evolution of hydrogen cyanide is accelerated by the presence of moisture, particularly under alkaline conditions.

An object of the present invention is, therefore, to prevent hydrogen cyanide poisoning by inhibiting the evolution of hydrogen cyanide from organic thiocyanate compositions.

A further object of the invention is to provide organic thiocyanate compositions in which the evolution of hydrogen cyanide is substantially inhibited or eliminated.

These and other objects, features, and advantages of the invention will become more apparent from the description which follows.

Accordingly, the evolution of hydrogen cyanide from an organic thiocyanate composition is inhibited by providing in said composition an effective amount of a compound reactive with decomposition products of the organic thiocyanate.

By "organic thiocyanate" or like term is meant an organic compound containing one or more thiocyanate (—SCN) or isothiocyanate (—NCS) radical attached to carbon, and which decompose alone or in admixture with solid carriers, solvents or diluents to evolve hydrogen cyanide. Of particular interest but not limited thereto are such compounds which exhibit antimicrobial activity against bacteria, fungi, and algae, pesticidal activity against insects, mites, and nematodes, and herbicidal activity.

Such thiocyanates may be aliphatic, aromatic, alicyclic, heterocyclic and may be simple organic thiocyanates which also contain oxygen, nitrogen, sulfur, chlorine, bromine, iodine, and the like elements. Among such compounds may be mentioned methylene bisthiocyanate, trans dithiocyanoethylene, 1,2 - dihalo - 1,2 - dithiocyanoethane; halomethyl thiocyanates such as mono-, and tri-chloro and -bromo thiocyanates; esters of thiocyanic acid and aliphatic alcohols such as hexyl thiocyanate, cyclohexyl thiocyanate, stearyl thiocyanate, oleyl thiocyanate, terpinyl thiocyanate, bornyl thiocyanate, fenchyl thiocyanate, isobornyl thiocyanate, methylcyclohexyl thiocyanate, hexyl thiocyanoacetate, cyclohexyl thiocyanoacetate, octyl thiocyanoacetate, octyl thiocyanopropionate, terpinyl thiocyanoacetate, bornyl thiocyanoacetate, fenchyl thiocyanoacetate, terpinyl thiocyanopropionate, terpinyl thiocyanobutyrate, beta-thiocyanoethyl propionate, beta-thiocyanoethyl thiocyanoacetate, beta-thiocyanoethyl laurate, beta-thiocyanoethyl stearate, beta-thiocyanoethyl benzoate, butyloxyethyl thiocyanate, butyloxyethyl thiocyanoacetate, beta-butoxy-beta'-thiocyanodiethyl ether, glycerol thiocyanate distearate, benzyl thiocyanoacetate, styrol dithiocyanoacetate, glycol dithiocyanoacetate, diphenylamine dithiocyanate, furfuryl thiocyanoacetate, butyl thiocyanate, lauryl thiocyanate, and cetyl thiocyanate; and organo thiocyanoacrylates such as aliphatic esters of thiocyanoacetic acid, α-thiocyanopropionic acid, β-thiocyanopropionic acid, thiocyanobutyric acid, and the like. These and other thiocyanates are disclosed, including synthesis and use, in the literature, such as U.S. Pats. 2,214,971, 2,486,090, 2,572,564, 2,650,240, 3,205,247, 3,212,963, 3,222,248, 3,235,580, 3,223,536 and German Pat. 1,188,858.

While not fully understood, it is believed that the inhibition of hydrogen cyanide evolution from organic thiocyanates operates both by stabilization and hydrogen cyanide scavenging. In the former sense, the organic thiocyanate is prevented from forming hydrogen cyanide as a decomposition product. In the latter sense, hydrogen cyanide decomposition product is removed as it is formed. In some cases the mechanism of inhibition may be stabilization; in others it may be scavenging; and in still others, both effects may be present.

As an illustration of the proposed principle of the invention may be considered the known mechanism of decomposition of an organic thiocyanate in a hydroxylic medium as follows:

(1) 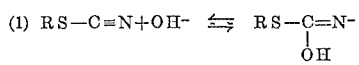

(2) 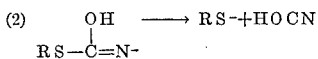

(3) 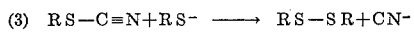

The hydroxylic medium may be water, an alcohol, an aqueous acid or base, or the like. From the equations above it will be noted that a mercaptan intermediate (RS⁻) is formed followed by further reaction with thiocyanate to form a disulfide and cyanide ion. In terms of stabilization, the evolution of hydrogen cyanide in Equation 3 is prevented by addition of a compound which removes the mercaptan by reaction therewith, thereby reversing the equilibrium so as to maintain the thiocyanate in predominate amounts. In terms of scavenging, an additive is provided in the thiocyanate composition to remove cyanide decomposition product by reaction therewith.

The additives employed in the present invention to inhibit the evolution of hydrogen cyanide are any compounds which are reactive with the decomposition products of the thiocyanate. As already mentioned, the decomposition product reacted with the additive may be hydrogen cyanide, in which case hydrogen cyanide evolution is inhibited by scavenging of same, or the decomposition product may be another compound which, when reacted with the additive, causes an equilibrium adjustment favoring stabilization of the thiocyanate. A decomposition product of the latter character is mercaptan ($RS^-$) as illustrated in the equations above. The additive compounds useful for inhibition of hydrogen cyanide evolution therefore include a great variety of materials. Among these may be mentioned aldehydes, both aliphatic and aromatic, such as formaldehyde, acetaldehyde, propionaldehyde, n-butyraldehyde and isomers, crotonaldehyde, benzaldehyde, acrolein, and aldehyde generating compounds such as trioxane. Other useful additives are ethyl formate, 1-chloro-2,4-dinitrobenzene, and the like. Particularly preferred among the foregoing are the aliphatic lower ($C_1$–$C_8$) aldehydes such as formaldehyde, acetaldehyde, propionaldehyde, and n-butyraldehyde.

Minor amounts of the hydrogen cyanide inhibitors are effective. For example, from about 0.1% to 10% of the inhibitor based on total weight of a concentrated formulation containing from about 1% to 50% by weight of the organic thiocyanate in a solvent such as dimethyl formamide will be useful. This corresponds to weight ratios of from 0.1:50 to 10:1, based on the thiocyanate itself. A preferred range is from about 0.5% to 5%, same basis. Conventionally such concentrated formulations are diluted to desired use concentrations or added directly to the system to be treated. It will be evident that proportions of organic thiocyanate and hydrogen cyanide inhibitor are not critical and need only be such as to provide effective inhibition of hydrogen cyanide, while also bearing in mind solubility and economy.

As already indicated, the organic thiocyanate compositions treated in accordance with the invention may be either pure thiocyanate compounds, liquid or dry, but more usually are substantially dry powders alone or in admixture with solid carriers such as clay, diatomaceous earth, or the like, or concentrates of the organic thiocyanate in aqueous, non-aqueous, or mixtures of aqueous and non-aqueous solvents or diluents. The formulations may as desired also contain known additives such as dispersants, humectants, emulsifiers, buffering agents to maintain the more desirable neutral or acid pH, and other biocidal agents including chlorinated phenols, quaternary ammonium compounds, alkyl guanidine acid salts, organo metallics such as bistributyl tin oxide, mercurials, and the like.

Suitable solvents are a matter of choice, depending on solubility of the particular organic thiocyanate. Solvents or diluents include numerous well-known compounds such as alcohols, including methanol, ethanol, isopropanol and the like; ketones, including acetone, methylethyl ketone and the like; glycols and glycol esters such as ethylene glycol, dioxane, ethylene glycol monomethyl ester, and the like; hydrocarbon solvents such as kerosene, benzene, toluene, and the like; and miscellaneous solvents such as acetonitrile, dimethyl formamide, tetrahydrofuran, dimethyl sulfoxide, and the like.

The concentration of organic thiocyanate in liquid formulations is not critical and will depend on solubility therein as well as economy. Generally, such formulations are sold as concentrates, e.g., from about 10 to 50% of organic thiocyanate by weight based on the weight of the total composition. A particularly preferred solvent is dimethyl formamide since it is frequently useful also as the reaction medium in the preparation of organic thiocyanates.

As indicated above the hydrogen cyanide inhibitor may be added to dry or liquid formulations containing the organic thiocyanate or may be employed as all or part of the solvent medium in the synthesis of the organic thiocyanate. When employed as all or part of the solvent medium in the preparation of the organic thiocyanate the inhibitor is retained in the "wet cake" precipitate resulting from separation of the thiocyanate from a major proportion of the solvent. For example, in a typical synthesis, methyl dibromide and sodium thiocyanate are reacted in a methyl alcohol medium also containing an inhibitor for hydrogen cyanide evolution to form methylene bisthiocyanate. The product thiocyanate is then crystallized by addition of water and the crystalline product or "wet cake" will retain sufficient inhibitor to minimize evolution of hydrogen cyanide. Alternatively, the same thiocyanate may be prepared in a medium in which the by-product salt (NaBr) is insoluble. The inhibitor is added to the filtrate containing the product thiocyanate before but preferably after precipitation of by-product salt cake. By any of the foregoing procedures, hydrogen cyanide evolution is inhibited.

The inhibitor may also be added to process waters or other environments to be treated with the organic thiocyanates. For example, where the organic thiocyanate is added to the water of cooling towers or water floods in secondary oil recovery for microbial control, the inhibitor may be added to the process water before or after addition of the organic thiocyanate. Preferably the inhibitor is provided in the organic thiocyanate formulation which is then added to the process water.

The pH of the reaction mixture or formulation containing the organic thiocyanate compound is not critical with respect to effectiveness of the hydrogen cyanide inhibitor. However, best results are obtained by maintaining the pH on the acid side since it is known that basic conditions accelerate the decomposition of the organic thiocyanate.

The following examples further illustrate the invention but are not limitative thereof except as indicated in th appended claims. All parts and percentages are by weight unless otherwise specified.

EXAMPLES 1–4

Table I below shows typical organic thiocyanate shelf formulations in which hydrogen cyanide evolution is fully or substantially inhibited over extended periods of time. Formulation A contains 25% by weight methylene bisthiocyanate (MBT) in dimethyl formamide and up to about 1% by weight water. Formulation B is technical or "wet cake" methylene bisthiocyanate, i.e., thiocyanate containing about 15% by weight water. Formulation C is a commercial concentrate containing 10% by weight methylene bisthiocyanate in a co-solvent system of kerosene, dimethyl formamide, and minor amounts of an emulsifying agent.

In the test procedure, 200 milliliters of formulations A and C and 50 grams of formulation B are added to separate 500 milliliter bottles equipped with caps fitted with inlet and exhaust ports. Initial hydrogen cyanide concentration above the surface of the formulations is determined with a commercial hydrogen cyanide detector device which draws vapor to be tested into a sampling tube containing a reagent for hydrogen cyanide. In the same manner, identical samples, except for the presence of 1 milliliter of inhibitor 1 gram in the case of 1-chloro-2,4-dinitrobenzene), are tested for hydrogen cyanide decomposition product over a period of time ranging from several hours to several weeks or months. Except where indicated the data does not represent limiting duration of inhibitor since the tests are continuing.

TABLE I.—HYDROGEN CYANIDE CONCENTRATION IN MBT[1] FORMULATIONS

| Example | Inhibitor | A | B | C |
|---|---|---|---|---|
| Control | None | 3-10 p.p.m. after 3 days | 10-20 p.p.m. after 3 days | 30-50 p.p.m. after 1 day. |
| 1 | Formalin[2] | None after 15 weeks | None after 3 weeks | None after 7 weeks. |
| 2 | Ethyl formate | None after 4 weeks; trace after 5 weeks | | |
| 3 | 1-chloro-2,4-dinitrobenzene | None after 2 weeks; 3 p.p.m. after 4 weeks | | |
| 4 | n-Butyraldehyde | None after 3 weeks | | |

[1] Methylene bisthiocyanate.
[2] 36% by weight formaldehyde in water. In other tests, hydrogen cyanide evolution was reduced by 0.3 ml. of formalin from 25 p.p.m. to 3 p.p.m. in 12 days and maintained at this level for at least 5 weeks.

EXAMPLE 5

In other tests employing dimethyl sulfoxide as solvent in place of the dimethyl formamide in the formulations of Examples 1-4, substantially the same levels of inhibition of hydrogen cyanide evolution is effected by addition of the inhibitors of the foregoing examples. Substantially the same advantages result when treating similar formulations containing monochloromethyl thiocyanate in place of methylene bisthiocyanate as shown in Table II below in which formulation A is 14.5 grams of monochloromethyl thiocyanate in 85 grams of dimethyl formamide and formulation B is the same solution but also containing 1 milliliter of formalin (36% formaldehyde in water) per 100 milliliters of solution.

TABLE II.—HYDROGEN CYANIDE CONCENTRATION IN CMT[1] FORMULATIONS

| | A | B |
|---|---|---|
| Formalin | 0 | 1%. |
| HCN | 3-4 p.p.m. after 3 days | 0 p.p.m. after 3 days. |

[1] Monochloromethyl thiocyanate.

We claim:

1. A method of inhibiting the evolution of hydrogen cyanide from a composition containing an organic thiocyanate compound which has one or more thiocyanate radicals attached to carbon and which decomposes alone or in admixture with carriers, solvents or diluents to evolve hydrogen cyanide which comprises providing in said composition an effective hydrogen cyanide-inhibiting amount within the range of about 0.1% to 10% by weight based upon the composition of an aliphatic lower ($C_1$–$C_8$) aldehyde, ethyl formate, or 1-chloro-2,4-dinitrobenzene.

2. The method of claim 1 wherein said aldehyde is formaldehyde.

3. The method of claim 1 wherein said aldehyde is butyraldehyde.

4. The method of claim 2 wherein said organic thiocyanate compound is methylene bisthiocyanate or monochloromethyl thiocyanate.

5. A method of inhibiting the evolution of hydrogen cyanide from a composition containing methylene bisthiocyanate which comprises providing in said composition an effective hydrogen cyanide-inhibiting amount within the range of about 0.1% to 10% by weight of a lower aldehyde, ethyl formate, or 1-chloro-2,4-dinitrobenzene.

6. A biocidal composition characterized by inhibition of hydrogen cyanide evolution which comprises methylene bis-thiocyanate and, in an amount effective to inhibit said hydrogen cyanide evolution, a member of the group consisting of a lower aldehyde, ethyl formate, and 1-chloro-2,4-dinitrobenzene.

7. A composition according to claim 6 in which the said member of the group is formaldehyde.

References Cited

UNITED STATES PATENTS

| | | | |
|---|---|---|---|
| 2,423,291 | 7/1947 | Borglin | 260—454 |
| 2,859,090 | 11/1958 | Karchmer et al. | 23—151X |
| 3,135,582 | 6/1964 | Geerts et al. | 23—151 |

OTHER REFERENCES

Yokoi: Chemical Abstracts, vol. 46, pp. 7230 (1952).

LEWIS GOTTS, Primary Examiner

G. HOLLRAH, Assistant Examiner

U.S. Cl. X.R.

260—347.4; 424—285,302; 71—88, 104